United States Patent Office 3,832,192
Patented Aug. 27, 1974

3,832,192
CERAMIC DIELECTRIC PORCELAINS
Charles Michael McIntosh, Cold Spring, N.Y., assignor to International Business Machines Corporation, Armonk, N.Y.
No Drawing. Continuation-in-part of abandoned application Ser. No. 855,731, Sept. 5, 1969. This application Aug. 6, 1971, Ser. No. 169,813
Int. Cl. C04b 33/26; H01g 3/135
U.S. Cl. 106—46                            1 Claim

ABSTRACT OF THE DISCLOSURE

Production of sintered ceramic porcelain dielectrics having a predominant spinel phase and air sintered between 800–900° C. from a green sheet providing uniform dielectric properties and compressibility for lamination of stacked green sheets into a unitary laminate which may be provided with internal patterns of electrical conductors extending therein. The structure is obtained by blending the ceramic particulate with a suitable glass and low temperature firing or sintering the composition between said 800–900° C. Densification of the green module and metallization, glass bead sealing of the pins, and hardening of the pins by oxidation were accomplished in a single air-cofiring in the above temperature range.

RELATED APPLICATIONS

This invention is a Continuation-In-Part of my co-pending Application Ser. No. 855,731 entitled "Low-Temperature Spinel Porcelain" and filed Sept. 5, 1969, now abandoned, and related to co-pending Application Ser. No. 133,325 entitled "Low-Temperature Spinel Porcelain" and filed Apr. 12, 1971, now abandoned.

FIELD OF THE INVENTION

This invention relates to the production of ceramic porcelain structures having a dominant spinel phase which are capable of being sintered at a temperature between 800–900° C. and suitable and adapted for utilization for multilayer ceramic circuit structures. Porcelains are believed to be vitreous ceramic whitewares. These whitewares are hard, translucent, white, sonorous and nonporous. They are high silica content (greater than 1% $SiO_2$ and maybe over 50%) ceramics. Porcelain is a term to designate such products as electrical, chemical, mechanical, structural and thermal ware when they are vitreous. In other words, porcelains are vitreous ceramic whitewares used for technical purposes. In countries other than the United States, it is used as a synonym for chinaware. Types of electrical porcelain well known and in use in the United States are the following: alumina ($Al_2O_3$), cordierite ($2MgO2Al_2O_3 \cdot 5SiO_2$), forsterite ($2MgOSiO_2$), steatite ($MgOSiO_2$), titania ($TiO_2$), zircon ($ZrO_2SiO_2$), etc. All of the foregoing are high temperature electrical porcelains per se. Low temperature vitreous ceramics could be developed in which they are the esential crystalline phase.

BACKGROUND OF THE INVENTION

U.S. Pat. No. 3,540,894 relates to the background of the invention and explains that advances presently being made in microelectronic devices are being deterred by certain inherent limitations in existing designs. The single insulating substrate, typically ceramic, with deposits of conductive material on one or both sides allows only limited conductive patterns.

In efforts to achieve more complex, i.e. dense, circuitry, one approach has been to stack a plurality of such substrates, spaced from one another for insulation purposes. Such an approach has proven to be unfeasible because of difficulty in electrically joining the patterns on the separated substrates, and in final assembly. A second difficulty is the exposure of the conductive pattern to atmospheric effects. A third difficulty is the additional volume required by the use of separated substrates.

A second approach has been to use multilevel ceramic structures, composite ceramic bodies having electrically connected conductive patterns that may exist at a plurality of distinct, horizontal levels.

A common method for fabricating such multilevel ceramic structures requires: forming ceramic material into green sheets; forming vertical via holes at predetermined locations in the separate sheets; depositing electrode paste on the desired areas of the separate sheets and in the via holes; stacking the sheets one upon another and subjecting them to either moderate temperature and pressure or just to very high pressure for a period of time long enough to laminate the sheets; and subjecting the laminate to ceramic firing temperatures to mature the ceramic and simultaneously fire the screened paste.

One difficulty encountered with this approach is that at the temperatures required to bond the separate ceramic sheets together, typically 1200–1650° C. and higher, the more highly conductive electrode materials such as copper and silver with melting points of 1083° C. and 960.5° C., respectively, melt so that one is limited to using more expensive, less conductive materials such as platinum and palladium, which do not melt at these bonding temperatures.

Most of the development effort on multilevel circuit modules has emphasized the high temperature ceramic approach utilizing both air and hydrogen firing over 1300° C. These approaches utilize high temperature, high-dielectric-constant ceramics like the high aluminas (89 to 99+% $Al_2O_3$) together with high-melting point low-conductivity electrodes, such as platinum (Pt) or palladium (Pd) which are quite expensive. In addition, such refractory metals as tungsten (W), molybdenum (Mo) and molybdenum-manganese (Mo-Mn) are used for both the internal, as well as for surface metallization, due to their higher electrical conductivity and improved bonding action to the ceramic over the platinum and palladium. In the latter case, the sintering can be done in air, while in the former, sintering of the modules must be done in a hydrogen atmosphere to prevent oxidation of the electrodes.

It is an object of this invention to provide a ceramic porcelain which in the process of production is sintered or fired at a temperature between 800° C. and 900° C.

A further object is to provide a method of manufacture whereby the said firing or sintering is accomplished in normal air atmosphere.

A still further object is to provide a ceramic porcelain having a dielectric constant between 6 and 8.

A further object of this invention is to provide a ceramic porcelain suitable for use in multilayer ceramic modules wherein high conductivity metals are utilized for conductive leads and interconnections in said multilevel modules.

It is still a further object to produce a ceramic porcelain having appropriate flexure strength and thermal conductivity whereby said material is adaptable for use in multilevel modules.

A further object of this invention is to provide a ceramic porcelain material and a method of manufacturing same wherein said ceramic porcelain product is of substantially zero porosity and zero water absorptive.

DESCRIPTION OF THE PRIOR ART

In view of the high packing densities attainable with multilevel ceramic circuit structures, they have achieved extensive acceptance in the electronic industry for packaging of semiconductor integrated devices, and other elements, as for example, see U.S. Pat. No. 3,379,943, granted Apr. 23, 1968 to J. G. Breedlove and U.S. Pat. No. 3,502,520, granted Mar. 24, 1970 to B. Schwartz.

In the fabrication of multilevel structures, an electrically conductor-forming composition is deposited in a pattern on required ceramic green sheets which form components in the desired multilevel structure. The component green sheets may have via or feed-through holes punched in them, as required in the ultimate structure. The required number of component green sheets are stacked or superimposed in register on each other in the required order. The stack of green sheets is then compressed or compacted, as necessary, at a temperature to effect a bond between the adjacent layers of the green sheets in the protions between adjacent layers not separated by the electrical conductor-forming pattern. Thereafter, the green sheet laminate is then fired to drive off the binders and to sinter the ceramic dielectric structure having the desired pattern of electrical conductors extending internally therein.

It is generally considered essential (as explained more fully in U. S. Pats. No. 2,966,719, and No. 3,125,618) that the density of the fired ceramic approaches the theoretical possible figure for the rew material (e.g. ceramic particulate) selected. Also, that the ceramic product must be non-porous without formation of micropores in order to prevent detrimental effect upon the electrical characteristics thereon. On the other hand, the formation of such densified and non-porous fired ceramics was reflected in a necessary, comparable void-free densification of the ceramic particulate in green sheets which when sintered provides the desired ceramic product. Although such densified ceramic green sheets have been found satisfactory for a single level ceramic structure, they nevertheless provide serious problems in attempts to laminate them into multilevel structures, particularly where electrically conductor patterns are sandwiched or otherwise incorporated between levels.

As will be evident, a pattern of electrical conductors when coated on a green sheet will be defined in a relief pattern whose top surface is raised relative to the uncoated surface of the green sheet. Therefore, in laminating a second superimposed green sheet on a conductor patterned green sheet, it will be necessary to compress the two green sheets together to bring uncoated adjacent portions of the green sheets in contact with one another so that the portions may be bonded to form the desired integrated or unified ceramic laminate or structure.

Although the binder or agglomerating material characterizes the green sheet with some degree of pliancy and ductility as will be evident, any extended flow or extrusion of the individual green sheet in the stack within the plane under compression will necessarily be attended by distortion, elongation and/or possible rutpure of any electrical conductor pattern which may be contained between the adjacent green sheets in the stack. Accordingly, it is essential that the green sheets employed in the fabrication of multilayer ceramics must be characterized by dimensional stability within their plane, which precludes lateral flow of the green sheet ceramic if the integrity of the conductor pattern is to be maintained and to insure registration of the green cramic laminae of the stack. As a consequence, it is necessary that any distortions in the stack of green sheets under compression be substantially limited in the vertical plane when the uncoated sections of adjacent green sheets are brought into contact for bonding while closely conforming about the conductor pattern to insure complete conductor line enclosure.

Green sheet compositions available heretofore have not been amenable to compressive bonding to each other due to the inherent resiliency of the binder or glomerating systems employed for the ceramic particulate. In consequence, upon release of compression, the resiliency of the glomerating or binding system is characterized with an elastic rebound or spring back frequently accompanied by rupture of the bonded interface between adjacent green sheet laminate in the stack.

Accordingly, it is considered essential that a green sheet be provided for multilayer structures having lateral dimensional stability with sufficient compressibility to enable a necessary set to permit bonding to each other about an enclosed raised conductor pattern, while maintaining the desired degree of densification constant with necessary electrical and dielectric characteristics.

SUMMARY OF THE INVENTION

This invention provides new ceramic procelains adaptable for multilevel high speed computer circuits which require low dielectric constant ceramics together with high conductivity electrode or conductor pattern systems. The ceramic porcelains described herein have a dielectric constant between 6 and 8 and permit low temperature air firing between 800 and 900° C. which permits the use of high conductivity metals like silver and silver-based alloys for conductive leads. It is significant that the densification of the ceramic porcelains of this invention has been formed into multilevel ceramic modules with internal and surface metallization by a single air firing operation at about 860° C. This was accomplished by forming a green sheet comprising a normal spinel and a suitable glass to allow the ceramic and the glass to agglomerate at a temperature between 800 and 900° C. A minimum of 25% by weight of the normal spinel ceramic particulate ingredient was found necessary. The remainder of the green sheet prefired agglomeration was substantially glass or amorphous material or other crystalline material other than a spinel. The optimum range for spinel content is from 35% to 65% by weight and the range of frit or glass is from 65% to 35% by weight.

The spinels are chemically complex compounds crystallizing in the cubic system. The general molecular expression for this class of materials is $RO \cdot R_2O_3$ where the RO is the oxide of divalent elements such as the zinc, barium, magnesium, calcium and alkali earth type metals forming divalent oxides and $R_2O_3$ represents the oxide of trivalent elements such as aluminum, manganese and iron. The spinels have been classically characterized as being either normal or inverse spinels. The difference being only in the arrangement of the atoms in the crystal lattice. Generally, the inverse spinels, such as the ferrites, possess ferromagnetic properties. The spinels of this invention are concerned with only the normal spinels. Magnesium aluminate, $MgO \cdot Al_2O_3$, is often referred to in the literature as the true spinel. Although there are other spinels where the oxide of such metals as zinc, barium and calcium are combined with $Al_2O_3$ to form spinels capable of being used pursuant to the concept of this invention. These are alkaline earth type compounds possessing the typical spinel structure.

The porcelain ceramic agglomerate of this invention comprises at least 25% by weight of an alkaline earth spinel of the $RO \cdot Al_2O_3$ type, where RO is an alkaline earth oxide and is combined with a frit and air fired between 800 and 900° C. to form a porcelain ceramic having a crystalline spinel phase. The hydrophobic frits contemplated within the scope of this invention are those frits having melting points below 1150° C. Although a minimum of 25% by weight of spinel is contemplated, other crystalline material compatible with a spinel structure may be present. Broadly, the normal spinel content should be between 35% and 65% by weight and the frit from 65% to 35% by weight.

DESCRIPTION OF A PREFERRED EMBODIMENT

The ceramic agglomerate and method for production of the same in its broad aspects is in general applicable for use in the manufacture of ceramic porcelains having a spinel phase and fabricated by usual techniques in which essentially a ceramic slip is cast into sheets which are dried into self-supporting flexible green sheets for ultimate application in final or fired form has dielectric supports for printed circuits, insulation, capacitor components, other circuit elements (such as conductive paths, resistors, transistors, diodes, etc.) and the like, either as a single layer or multilayer support. In the fabrication of multilayer ceramics, the necessary green sheets are normally punched with via and register holes, screened with an electronic conductor-forming paste, and the required number of green sheets are then stacked in register, laminated to get the multilayer structure and then sintered or fired.

The ceramic slip is normally formulated in accordance with the usual practice from a ceramic particulate, a binder resin system and a solvent system. The function of the binder resin system is to provide adhesive and cohesive forces to hold the ceramic particulate together in its green sheet configuration. The solvent system is of a volatile composition whose role is to dissolve the binder resin into solution to aid in the uniformly mixing the binder resin with the ceramic particulate and to provide the necessary viscosity to the resultant ceramic paint for subsequent casting. The finely divided low dielectric ceramic particulate forms the substrate material in the ultimately fired structure.

A batch formulation of the typical porcelain was prepared by wet-blending an equal amount of frit and spinel having the following compositions:

THE FRIT

| Oxides | Weight percent | Mol. percent |
|---|---|---|
| CaO | 8.00 | 10.29 |
| $K_2O$ | 1.67 | 1.28 |
| MgO | 0.59 | 1.07 |
| $Na_2O$ | 2.39 | 2.79 |
| PbO | 17.21 | 5.56 |
| $Al_2O_3$ | 9.11 | 6.44 |
| $B_2O_3$ | 4.52 | 4.68 |
| $SiO_2$ | 56.47 | 67.85 |
| Total | 99.96 | 99.96 |

THE SPINEL

| Oxides | Weight percent | Mol. percent |
|---|---|---|
| ZnO | 19.33 | 21.57 |
| $Al_2O_3$ | 20.71 | 18.44 |
| $SiO_2$ | 20.41 | 30.85 |
| $ZrO_2$ | 39.53 | 29.12 |
| Total | 99.98 | 99.98 |

THE FRIT AND SPINEL COMBINATION

| | Mol ratio | | Mol ratio |
|---|---|---|---|
| ZnO | 0.4016 | $SiO_2$ | 2.2290 |
| PbO | 0.1259 | $Al_2O_3$ 0.5728 | |
| CaO | 0.2354 | | |
| MgO | 0.1202 | $B_2O_3$ 0.1091 | |
| $K_2O$ | 0.0845 | $ZrO_2$ | 0.5678 |
| $Na_2O$ | 0.0325 | | |
| Total | 1.0001 | | |

Batch formulations were made and processed by the well known conventional wet ball milling techniques.

The filter cake was dried overnight in an oven at a constant temperature of 150° C. The cake must be thoroughly dried before further processing.

The dried filter cake, which was fairly dense and hard, was broken into small chunks. These were then fed into a grinder pre-set to provide minus 100 mesh (149 microns) powder. The ground powder was then passed through minus 100 mesh using a Syntron vibrator. Generally, 95% of the powder is passed through the mesh in about 10 min. This casting slip using the minus 100 mesh material contained no agglomerates and required less milling time than when conventional minus 40 mesh material was used. Even finer mesh (e.g., −325 mesh [44 micron]) material would be preferred, but the material is too difficult to dry-screen. Other acceptable procedures could be used for body preparation.

The commercial particle size for glass frit is generally somewhat larger than particle sizes mentioned above. By wet-milling the body mix, both materials may be caused to approach the same particle sizes, as was done in this case.

The unfired ceramic spinel porcelain mixture herein has been developed specifically to be processed by the well known ceramic slip-casting doctor-blade techniques. The resulting cast sheets may then be processed by blanking, screening, plating by vacuum deposition and lamination techniques, into three-dimensional multilevel circuit modules, consisting only of the multilayered spinel porcelain and buried conductive elements.

The ceramic porcelain as prepared above, is combined with a suitable organic binder to prepare the body for processing by doctor-blading slip-casting techniques. For one example, the spinel porcelain slip was prepared by mixing a ceramic porcelain having a spinel phase and the binder, in a ball mill and then milling for about 12 hours to assure no aggregates. The binder had good casting ability properties and the slip was homogeneous and free of aggregates.

In the casting operation, a strip of Mylar, free of lint or dust, was used for the casting base, and grounded to avoid electrostatic charge build-up in the Mylar. The casting rate should be rapid enough to prevent formation of a surface shine on the casting slip behind the doctor blade. In a typical cast, a sheet four feet long and six inches wide was cast upon the Mylar base.

After three hours of air drying, the cast sheets were readily separated from the Mylar base, and further air dried, before firing.

Fabricated multilevel modules from the ceramic porcelain body herein of one batch were fired at three temperatures: 840° C., 860° C. and 880° C. The modules fired flat, square, dense, white and passed the Zyglo (Trademark of Magnaflux Corp., Chicago, Ill.) dye test for porosity. Over the temperature range measured, the percent change in linear shrinkage values for a specific type multilevel circuit module remained well within reasonable limits.

The firing temperature for the ceramic porcelain, based on the above firing results, was determined to be 860° C.±20° C. All multilevel test modules fired flat, square, dense and white.

It will be realized that in the interest of economy, the mix ingredients were used as commercially available, and thus provided the primary elements to form the desired ceramic porcelain with low dielectric constant and low firing temperature, although including various elements in minor percentages which might be varied or omitted without significantly affecting the desired characteristics of the ceramic porcelain wanted for the application designated by way of example herein, or for other similar applications.

The ceramic porcelain produced in accordance with the foregoing example exhibited an acceptable white color with zero porosity and zero water absorption characteristics. In addition to the aforesaid properties, the product produced had the following characteristics:

(1) Fired Linear Shrinkage: 16.00+0.35% with no internal metallurgy.

(2) Fired Weight Loss: 10.23±0.05%.
(3) Fired Density: 3.36±0.02 grams/cc.
(4) Linear Thermal Coefficient of Expansion:

$$\alpha_{RT \to 450^\circ C.}^{47.1 \times 10^{-7} in./in./^\circ C.}$$

(5) Fired Surface Finish: 32 C.L.A. microinches.
(6) Modulus of Rupture: 17.1 to $18.2 \times 10^3$ p.s.i. (This value is almost as good as the high temperature electro-porcelains.)
(7) Thermal conductivity:
    80° C.—0.00759 cal./sec.-cm.-° C.
    110° C.—0.00617 cal./sec.-cm.-° C.
    150° C.—0.00611 cal./sec.-cm.-° C.
(8) Dielectric Strength: 200 volts per mil.
(9) Dielectric Constant: 7.9.
(10) Dissipation Factor: 0.00030.

The dielectric constant and the dissipation factor were measured at 1 kHz. and ambient environment.

The low temperature firing ceramic porcelain having a spinel phase and disclosed herein provides more latitude in the selection of electrode materials. Among these metals, are the low cost high conductivity materials such as silver, silver-based alloys, silver palladium, gold, gold palladium and gold platinum. All these materials are commercially available as squeegee paste preparations to be applied by screen deposition techniques.

While this invention has been particularly described with reference to the preferred embodiments thereof, it will be understood by those skilled in the art that the foregoing and other changes in form and detail may be made therein without departing from the spirit and scope of the invention.

What is claimed is:

1. A ceramic dielectric porcelain composition capable of being sintered to maximum densification at a temperature between 800° C.–900° C. providing more latitude in the selection of metal electrode materials, and consisting of between 35% and 65% by weight of a frit having the following composition:

| | Wt. percent |
|---|---|
| CaO | 8.00 |
| $K_2O$ | 1.67 |
| MgO | 0.59 |
| $Na_2O$ | 2.39 |
| PbO | 17.21 |
| $Al_2O_3$ | 9.11 |
| $B_2O_3$ | 4.52 |
| $SiO_2$ | 56.47 | and between 65% and 35% of a crystalline material having a spinel phase and the following composition:

| | Wt. percent |
|---|---|
| ZnO | 19.33 |
| $Al_2O_3$ | 20.71 |
| $SiO_2$ | 20.41 |
| $ZrO_2$ | 39.53 |

References Cited
UNITED STATES PATENTS

| | | | |
|---|---|---|---|
| 3,365,314 | 1/1968 | Sack | 106—46 |
| 3,060,040 | 10/1962 | Bristow | 106—46 |
| 2,878,130 | 3/1959 | Harman et al. | 106—46 |
| 2,887,394 | 5/1959 | Bickford et al | 106—46 |
| 2,180,779 | 11/1939 | Stribeck | 106—46 |
| 2,290,107 | 7/1942 | Luks | 106—46 |
| 3,540,894 | 11/1970 | McIntosh | 106—39 R |
| 3,095,321 | 6/1963 | Breedlove | 106—48 X |

OTHER REFERENCES

Ceramic Industry, Handbook of Materials for Ceramic Processing, January 1967, pp. 52 and 153.

HELEN M. McCARTHY, Primary Examiner

U.S. Cl. X.R.

106—49, 53; 317—258